May 6, 1924.

C. E. COCHRAN

INDUSTRIAL TRUCK

Filed March 12, 1923

1,492,701

2 Sheets-Sheet 1

INVENTOR
Clyde E. Cochran,
By Bates, Macklin
ATTYS.

May 6, 1924.

C. E. COCHRAN

INDUSTRIAL TRUCK

Filed March 12, 1923    2 Sheets-Sheet 2

1,492,701

INVENTOR
Clyde E. Cochran,
BY Bates & Macklin,
ATTYS.

Patented May 6, 1924.

1,492,701

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

INDUSTRIAL TRUCK.

Application filed March 12, 1923. Serial No. 624,685.

*To all whom it may concern:*

Be it known that I, CLYDE E. COCHRAN, a citizen of the United States, residing at Cleveland, in the county of Cuyahoga and State of Ohio, have invented a certain new and useful Improvement in an Industrial Truck, of which the following is a full, clear, and exact description, reference being had to the accompanying drawings.

This invention is concerned with industrial trucks of an electrically propelled type and has for its object the provision of motor reversing and speed control mechanisms associated with an operator's support whereby the speed of the vehicle may be controlled through varying degrees by the operator shifting his weight on a movable or foot platform support.

A more specific object of the present invention is the provision of a pedal operated, manually reversible link mechanism arranged to connect a foot pedal to motor speed control means, and a second link mechanism associated with the pedal whereby the speed control means is rendered ineffective when the operator is not in operative position on the truck.

Other objects will be apparent from the following description taken in connection with the accompanying drawings and the essential features will be summarized in the claims.

Figures 1, 5:
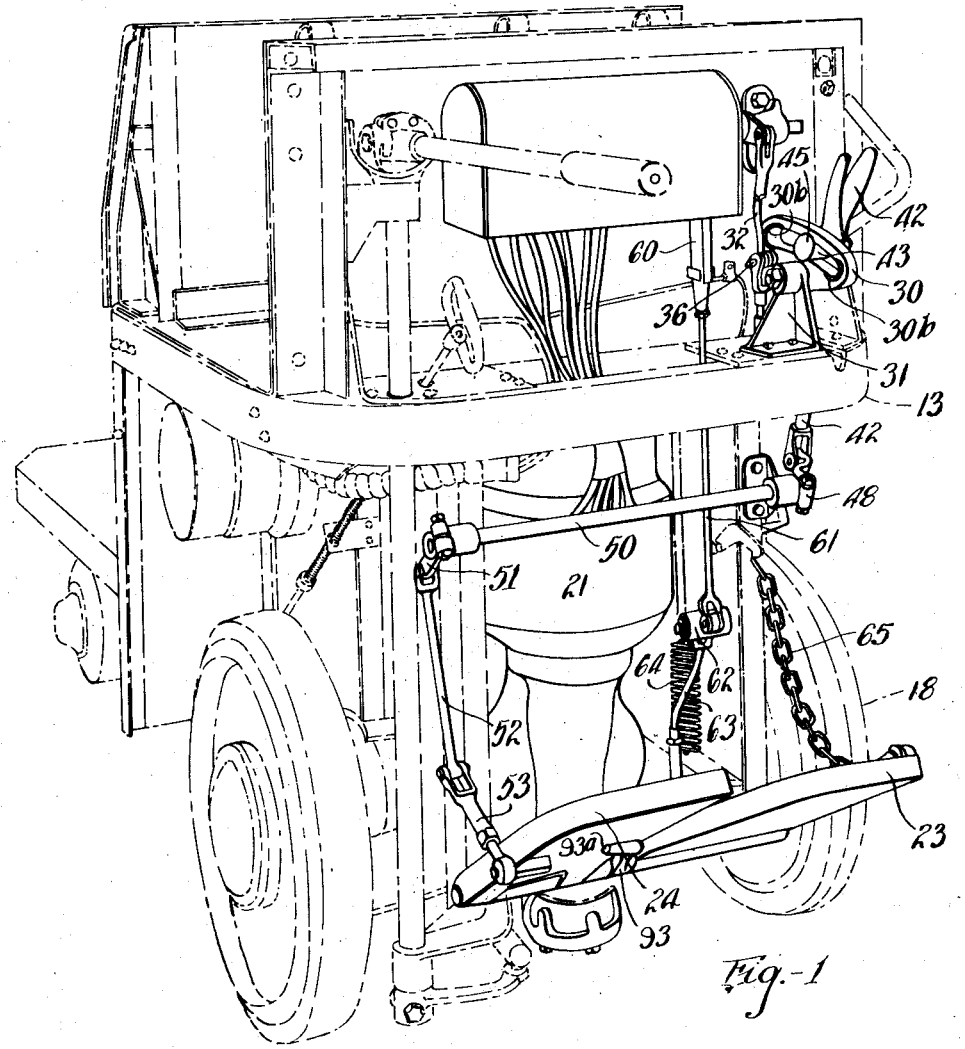
Figure 2:
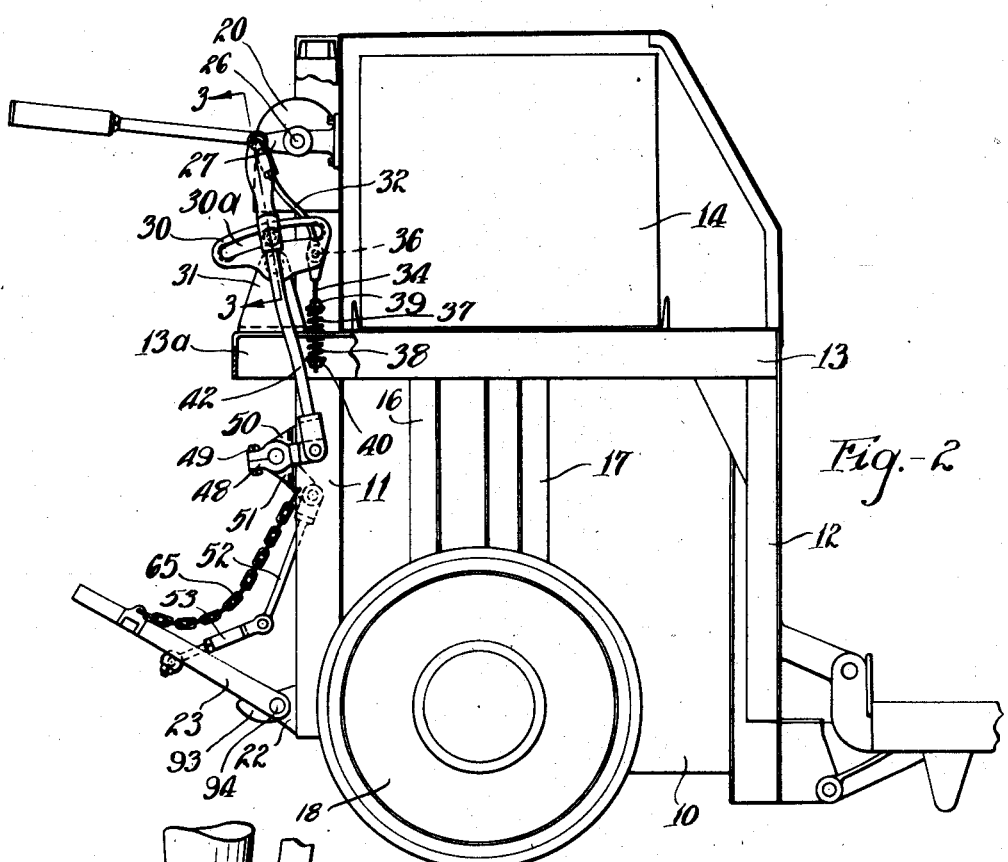
Figure 3:
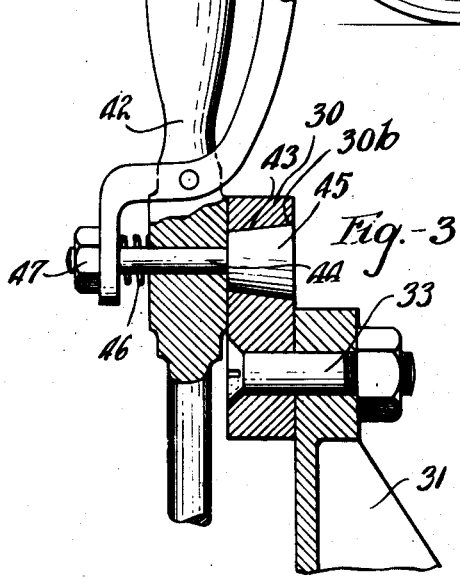
Figure 4:
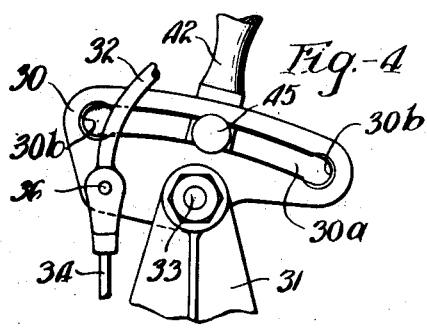

In the drawings, Fig. 1 is a perspective view of the various mechanisms embodied in my invention as applied to a platform truck, the truck being shown in perspective in dot and dash lines; Fig. 2 is a side elevation of the forward operator's end of the truck; Fig. 3 is an enlarged cross sectional view taken through a link reversing mechanism substantially along the line 3—3 of Fig. 2; Fig. 4 is an enlarged fragmentary elevation as observed from the left side of the truck; Fig. 5 is a diagrammatic representation of the motor reversing switch and controller.

I have shown my invention embodied in an industrial truck such as I disclose in my patent Reissue No. 15,497, reissued November 28th, 1922, and assigned to The Elwell-Parker Electric Company, wherein a truck of the automatic or load lifting type is disclosed and which is provided with a motor and battery therefor and large motor driven wheels disposed adjacent the operator's position on the truck. In the present invention, I incorporate a link mechanism in the motor control mechanism whereby the speed of the motor which propels the vehicle may be varied by the operator shifting his weight on a supporting platform attached to the forward end of the truck. The brake control may comprise a vehicle braking mechanism such as is described and claimed in Patent No. 1,069,991, issued August 12th, 1913, and assigned to The Elwell-Parker Electric Company.

As shown in Figs. 1 and 2, the truck comprises a frame 10 having upwardly extending members 11 and 12 which support a stage or battery supporting platform 13, the batteries being housed in a suitable covering 14 positioned thereon. Axle supporting members 16 and 17 extend between the frame 10 and the support 13 and engage an axle housing (not shown). Driving wheels 18 are carried by the axle housing.

Secured to the front side of the battery housing 14 is a controller 20 which is electrically interposed between the leads from the battery and a motor 21 which drives the wheels 18 through suitable reduction gearing (not shown). Attached to the upwardly extending frame member 11, are brackets 22 which support platforms 23 and 24 pivotally attached thereto. The controller 20 may be of a drum type wherein a series of contacts are arranged to progressively cut out resistance coils between the battery and the motor armature; the arrangement of the controller contacts being such, that turning of the controller in one direction will cause the motor to drive the vehicle in a forward direction and turning of the controller in a reverse direction from the neutral point will cause the motor to drive the truck in an opposite direction. The controller shaft 26 is accordingly provided with an arm 27 disposed exteriorly at one end of the controller housing.

Link mechanism is provided which may act upon the arm 27 to swing it either upwardly or downwardly from a neutral position and is operated upon a downward movement of an operator's support 24. The link mechanism is such that the controller arm 27 will be operated in only one direction as long as the reversing mechanism associated with the link mechanism is set to cause the controller to be operated in such manner. If it is desired to operate the controller in a reverse direction, the reversing mechanism associated with the link mechanism may be set manually by the operator.

Such a link and reversing mechanism may comprise a yoke member 30 pivotally supported on a bracket member 31 secured to a forwardly projecting end 13ª of the battery support 13. Connecting members extend upwardly to the controller and downwardly to the platform 24. The yoke member 30 is connected to the controller arm 27 by a link member 32 which is connected to the inner end of the yoke member. The link 32 and a downwardly extending spring operated rod member 34 are pivotally connected to the yoke by a pin member 36. The member 34 extends downwardly through an opening formed in the battery support 13ª and is acted upon by opposed spring members 37 and 38 disposed above and below the top portion of the battery support 13ª respectively. The spring members 37 and 38 act upon thrust collars 39 and 40 which are attached to the member 34, and thus serve to maintain the yoke member 30 in such position that the controller arm 27 will be normally maintained in the neutral position shown in Fig. 2.

The yoke member 30 is rocked upon its pivot 33 by a manually shiftable lever member 42 which is connected to the yoke member 30 by a block 43 slidably mounted in a slot 30ª of the yoke and a yieldable pin member 44 having a beveled head 45 thereof in resilient engagement with the edges of the yoke slot. Said edges are beveled at the extremities of the slot as indicated at 30ᵇ whereby the pin head 45 may rest therein. The pin head member 45 is maintained in engagement with said edges by a spring member 46 acting against the outer side of the lever member 42 and against a nut 47 positioned on the outer end of the bolt member 44. It will be readily understood that if the lever member 42 is swung forwardly from the neutral position shown in Fig. 2, the downward movement of the member 42 will cause the controller arm to be swung upwardly. If the lever member 42 is swung rearwardly, the controller arm 27 will be turned downwardly upon a downward movement of the lever member 42.

The means connecting the manually adjustable lever member 42 to the platform 24 may comprise a small arm 48 rigidly mounted on the right end of a rocker shaft 49 pivotally supported by brackets 50 attached to the forward truck frame members 11 intermediate the controller and the operator's support 24. The rocker shaft 49 may extend transversely of the truck whereby a second arm 51 may be mounted on the opposite end of the rod and afford connection for an intermediate link member 52 which extends downwardly and is connected to an adjustable lever member 53 pivotally attached to the operator's support 24. It will thus be seen that when the operator stands on the platform 23 and gradually bears down on the platform 24, the lever member 42 will swing one end of the yoke member 30 downwardly and thus cause either an upward or downward movement of the controller arm 27 according to the position of the lever member 42. If the operator desires to drive the truck at a very slow speed, he will exert only a slight pressure upon the platform member 24 and thus cause the first contact of the controller to connect the motor battery through all resistances, etc.

The relation of the link members 52 and 53 to the entire link mechanism is such that when the platform 24 is in a substantially horizontal position, further downward movement thereof is arrested and the link mechanism may therefore be of sufficient strength to support the entire weight of the operator on the platform 24. If the operator desires to increase the speed, the controller arm may be moved to its extreme position and all of the resistance is cut out in the electrical connection between the battery and the motor. The motor will thus drive the truck at full speed.

I provide additional means for rendering the controller inoperative in the event the operator steps off the platforms 23 and 24. The means may comprise a switch operating member 60 which is moved vertically by a rod 61 connected to a rocker arm 62 pivotally mounted on one of the upright frame members 11. A second link member 63 may connect the arm 62 to the platform 23. A spring 64 acts on the link mechanism to maintain the platform 23 in an upward position and to maintain the switch member 60 in an open relation to the main line from the battery to the controller. A heavy chain 65 serves to arrest the downward movement of the platform 23 when the operator is in position on the truck.

In Fig. 5, I show diagrammatically, the relation of the battery to the motor and reversing switch mechanism. The reversing switch is diagrammatically represented at S, the motor at M and the battery at B. While the switch closing elements in the controller comprise segments mounted on the drum, I show for convenience an equivalent mechanism comprising parallel switch arms 70 and 71 connected by a non-conductive bar 72, the bar 72 being adaptable for engagement with a pin member 73 mounted on the arm 74 which is the equivalent of the controller drum. The arm 74 when swung to neutral position by neutrally positioning the exterior arm 27, brings the pin 73 into engagement with the bar 72 and the switch members 70 and 71 are thus swung to an open position. As shown in the diagram, the switch arms 70 and 71 are swung to the left so that the arm 71 acts to connect a battery line 75 through a line 76 to the motor M. A return line 77 is connected to the battery through the switch member 70, the contacts 78, the line 79, the arm 74, the controller resistance $C^1$ and the line 80. As the arm 74 is swung further to the left to cut out more of the resistance $C^1$, the speed of the motor will thus be increased.

As hereinbefore stated, the swinging of the reversing lever 42 to move the block 43 from one extremity of the yoke slot 30 to the other, will thus cause the control arm 74 to be swung to the right into connection with the resistance $C^2$ in which case the current will flow from the battery through the line 75, the arm 70, the line 77, to the motor and from the motor to the switch to the line 76, thence through arms 71, contact 90, line 79, through the arm 74, the resistance $C^2$ and thence through the line 81 to the battery. It will thus be seen that the direction of flow of the current to the motor is reversed and that a set of resistance is provided for each direction of flow. A safety switch is diagrammatically shown at 83 in Fig. 5. This switch is positioned in the controller housing and is operated by the member 60 in a well known manner, the switch being maintained open by the spring 64 when the operator is not in position on the truck.

To arrest movement of the vehicle when the controller is in neutral position, the braking mechanism referred to, may be incorporated in the present structure, whereby it becomes effective when the pedal or platform 24 is in extreme upward position. A lever member 93 may be mounted upon the platform pivot shaft 94 and be disposed between the platforms 23 and 24. The lever 93 may have a projection $93^a$ extending beneath the platform 24, whereby downward controller operating movement of the platform will cause the lever 93 to be depressed downwardly and thus render the braking mechanism ineffective. It will be seen that if the operator leaves his position on the truck or relieves all weight from the platform 24, the controller mechanism will become ineffective, that is disconnect the motor from the battery and the braking mechanism will immediately arrest movement of the truck.

From the foregoing, it is to be seen that I provide a vehicle control mechanism which is readily responsive to the operator's manipulation of a platform attached to the forward end of the truck and upon which he stands. The character of the mechanism is such that it may be attached, adjacent the operator's position, to the truck frame and may be of a substantial character whereby constant service may be obtained regardless of any severe usage to which it may be subjected. The operator's undivided attention may be given to the steering of the truck while the speed of the truck is controlled by the foot operated device.

Having thus described my invention, I claim:

1. In an automotive truck, the combination of a motor, a controller for governing resistance connected with the motor, an operator's support, and mechanism connecting the controller and the operator's support, whereby the varying of the operator's weight upon the support will vary said resistance.

2. In an automotive truck, the combination of a motor, a resistance controller therefor, a foot operated member comprising an operator's support, and mechanism connecting the controller and said member, whereby the speed of the vehicle may be varied by varying the pressure on said member.

3. In a vehicle of the character described, the combination of a motor, a reversible controller for governing the motor speed, an operator's support, and link mechanism connecting the controller and the support, whereby the operator may vary the speed of the vehicle when driving in either a forward or a reverse direction by varying pressure on the support.

4. In vehicle of the character described, the combination of a motor, a resistance varying controller, a foot operated member and reversible link mechanism connecting the controller and the foot operated member, whereby the operator may vary the speed of the vehicle when driving in a forward or a reverse direction.

5. In an automotive truck, the combination of a motor, a resistance varying controller, a pedal member, and a reversible link mechanism connecting the controller and the pedal member, whereby the operator may vary the speed of the vehicle by operating the pedal and may reverse the action of the link mechanism on the controller and thereby reverse the motor.

6. In an automotive truck, the combination of a motor, a reversible controller, an operator's support, and a reversible link mechanism connecting the controller and the support, whereby the operator may vary the speed of the vehicle by varying the amount of his weight upon the support and may reverse the action of the link mechanism on the controller.

7. In a truck of the character described, the combination of a motor, a reversible controller, an operator's support comprising a pivotally mounted platform connected to the forward end of the truck, and connecting means between the controller and the platform, whereby pressure on the support will operate the controller and vary the speed of the vehicle.

8. In an industrial truck, the combination of a motor adapted to drive the truck, a reversible controller therefor, an operator's support comprising a pivotally mounted pedal connected to the forward end of the truck, and mechanically reversible connecting means between the controller and the pedal, whereby pressure on the pedal will operate the controller and vary the speed of the truck when said motor is driving the truck in a forward or reverse direction.

9. In a vehicle, a motor adapted to drive the vehicle, a battery, a controller for electrically connecting the motor to the battery through resistance, an operator's platform attached to one end of the vehicle, said platform being movable, and connecting mechanism between the controller and the platform, whereby the operator may move the platform and thereby vary the controller to cut in and cut out the resistance in the motor line.

10. In an electrically propelled vehicle, a motor for driving the vehicle, a controller for varying the speed of the motor, a battery, said controller being arranged to reverse the connections between the battery and the motor, whereby the vehicle may be driven in either direction, an operator's support comprising a movable platform responsive to the weight of the driver's body, and a link mechanism connecting the controller and the platform, the action of said link mechanism being reversible relative to the controller by the adjusting of one of the members thereof.

11. In a vehicle, a motor adapted to drive the vehicle, a battery, a controller for electrically connecting the motor to the battery through resistance, an operator's platform attached to one end of the vehicle, said platform being pivotally mounted and reversible link mechanism between the controller and the platform, whereby the operator may adjust the mechanism and move the platform by standing upon it and thereby vary the controller position to cut in or cut out the resistance when the motor is driving the vehicle in either a forward or backward direction.

12. In a self-propelled vehicle, a motor for driving the vehicle, a battery, a controller electrically connected between the battery and the motor, an arm on said controller, an operator's platform, said platform being movable and responsive to a partial weight of the operator and a link mechanism connecting the controller arm to the platform, whereby a full downward movement of the platform causes said link mechanism to act upon the controller arm and thereby operate said controller to an extreme position.

13. In a self-propelled vehicle, a motor for driving the vehicle, a battery, a controller adapted to vary resistance in an electrical connection between the motor and the battery, a movable platform for supporting the driver, a link mechanism connecting the controller to the platform, said link mechanism including a manually shiftable member, and a second member coacting therewith whereby said shiftable member may be adjusted relative to the coacting member to cause said link mechanism to operate the controller in opposite directions and thereby reverse the electrical connections on said motor.

14. In a self-propelled vehicle, a motor for driving the vehicle, a battery, a controller electrically connected between the battery and the motor, arm on said controller, an operator's platform, said platform being movable from an inclined to a substantially horizontal position and responsive to a partial weight of the driver, a link mechanism connecting the controller arm to the platform, whereby a downward movement of the platform causes said link mechanism to act upon the controller arm and thereby operate said controller to an extreme position when the platform is in said horizontal position.

15. In a self-propelled vehicle, a motor for driving the vehicle, a battery, a controller adapted to vary resistance in electrical connection between the motor and the battery, a movable platform for supporting the driver, a link mechanism connecting the controller to the platform, said link mechanism comprising a pivotally mounted yoke member, and a second member having a shiftable pivot connection with the yoke member whereby the yoke member may be swung in one direction to actuate the controller and in a reverse direction to actuate the controller in a reverse direction.

16. In a truck of the character described, the combination of a plurality of supporting members pivotally mounted on the truck frame, a motor for driving the vehicle, a battery connected to the motor, a controller for varying resistance in the line connecting the battery to the motor, means connecting the controller to one of said platforms and reversible in its action on the controller to vary resistance in the motor line by movement of the platform, and means associated with the controller for opening said line connecting the battery to the motor and means connecting said last named means with a second platform whereby said controller is rendered inoperative when the driver is not in position on said platform.

17. In a vehicle of the character described, the combination of a motor for driving the vehicle, a support for the vehicle operator in the nature of movable pedals, a brake control mechanism associated with one of the pedals and operable when the pedal is in an upward position and a speed control mechanism also associated with one of said pedals and controlling the speed of the vehicle by varying degrees, one of said pedals being adaptable to carry the weight of the operator.

18. In a self-propelled vehicle, a motor for driving the vehicle, a body, a controller electrically connected between the battery and the motor, an arm on said controller, an operator's platform, said platform being movable and responsive to a partial weight of the driver, a link mechanism connecting the controller arm to the platform, whereby a downward movement of the platform causes said link mechanism to act upon the controller arm and thereby operate said controller to an extreme position, and a brake mechanism controlled by said platform.

19. In a machine of the character described, the combination of a motor, a reversible controller, an operator's support comprising a pivotally mounted pedal connected to the lower forward end of the truck, connecting means between the controller and the support, whereby pressure on the support will operate the controller and vary the speed of the vehicle, and means operated by said pedal for releasing the braking mechanism of the vehicle.

20. In a vehicle, a motor adapted to drive the vehicle, a battery, a controller for electrically connecting the motor to the battery through resistance, an operator's platform attached to one end of the vehicle, said platform being movable, connecting mechanism between the controller and the platform, whereby the operator may depress the platform and thereby vary the controller to cut in or cut out resistance in the motor line and means associated with said platform for controlling the braking mechanism of the vehicle.

21. In a vehicle of the character described, the combination of a motor for driving the vehicle, a support for the vehicle operator in the nature of depressible pedals, a brake control mechanism associated with one of the pedals and a motor speed control mechanism also associated with said pedal, one of said pedals being adaptable to carry the weight of the operator and the other of said pedals being adapted to control the starting and stopping of the vehicle.

In testimony whereof, I hereunto affix my signature.

CLYDE E. COCHRAN.